United States Patent
Schetters

(10) Patent No.: US 7,321,483 B2
(45) Date of Patent: Jan. 22, 2008

(54) POWER CONVERTER

(76) Inventor: Cornelis Johannes Adrianus Schetters, Gerstweg 2, 6534 AE Nijmegen (NL)

(*) Notice: Subject to any disclaimer, the term of this patent is extended or adjusted under 35 U.S.C. 154(b) by 0 days.

(21) Appl. No.: 10/564,232

(22) PCT Filed: Jul. 8, 2004

(86) PCT No.: PCT/IB2004/051165

§ 371 (c)(1),
(2), (4) Date: Jan. 10, 2006

(87) PCT Pub. No.: WO2005/008868

PCT Pub. Date: Jan. 27, 2005

(65) Prior Publication Data

US 2007/0019448 A1    Jan. 25, 2007

(30) Foreign Application Priority Data

Jul. 17, 2003  (EP) .................................. 03102198

(51) Int. Cl.
*H02H 3/22* (2006.01)
(52) U.S. Cl. ..................................... 361/91.1; 361/111
(58) Field of Classification Search ................ 361/18, 361/91.1, 111; 363/52, 89, 126
See application file for complete search history.

(56) References Cited

U.S. PATENT DOCUMENTS

| | | | | |
|---|---|---|---|---|
| 4,864,488 A | * | 9/1989 | Bulmahn et al. | 363/143 |
| 5,162,984 A | * | 11/1992 | Castagnet et al. | 363/61 |
| 5,510,944 A | | 4/1996 | Mozar et al. | |
| 5,933,342 A | * | 8/1999 | Callanan | 363/126 |
| 6,219,263 B1 | * | 4/2001 | Wuidart | 363/125 |

FOREIGN PATENT DOCUMENTS

EP    1 315 276    5/2003

* cited by examiner

*Primary Examiner*—Michael Sherry
*Assistant Examiner*—Danny Nguyen

(57) ABSTRACT

A power converter comprising: a rectifier arrangement (D1-D4) having inputs coupled to AC power supply terminals; a pair of series-connected capacitors (C1, C2) coupled across output terminals of the rectifier arrangement; a switch (S1) coupled between one of said AC power supply terminals and a midpoint of the pair of series-connected capacitors, the switch being open if a first AC voltage is applied to the AC power terminals, and the switch being closed if a second AC voltage is applied to the AC power terminals, the first AC voltage exceeding the second AC voltage; and an overvoltage protection circuit (D5, R30, D6) coupled between at least one of the inputs of the rectifier arrangement and the midpoint of the pair of series-connected capacitors.

8 Claims, 4 Drawing Sheets

POWER CONVERTER

The invention relates to a power converter.

In power converters with a voltage doubler (see FIG. 1 for a typical application setup) an input mains voltage is rectified by a bridge rectifier D1-D4, and a remaining mains frequency ripple is filtered by means of electrolytic capacitors C1, C2. When Vac is about 110 V, switch S1 is closed, and when Vac is about 230 V, switch S1 is open. The midpoint of C1 and C2 is floating when S1 is open, possibly leading to an unbalance of the voltages across the capacitors C1 and C2 caused by the capacitor leakage current. This unbalance can lead to an overvoltage situation of C1 or C2. In theory the full DC voltage can be across one of the capacitors. For cost reasons capacitors are used having a maximum voltage of half the rectified DC voltage. One way to compensate for the leakage currents is the addition of resistors R1 and R2 in parallel to the capacitors C1, C2. A disadvantage of this approach is the inherent power dissipation. This jeopardizes low standby targets (e.g. Pin<1 W when Po=500 mW). Typically, a DC/DC converter followed by a load L are connected to an output of the bridge rectifier D1-D4.

An improvement of this circuit is proposed in EP-A-1315276. See FIG. 2 for the implementation. The proposed circuit in FIG. 2 reduces the dissipated power since the resistors R1 and R2 are regulated by transistors Q1 and Q2. Nevertheless the resistors R3, R4 and R5 are still conducting and adding to the input power consumption. The transistors Q1 and Q2 have to be high voltage switches, which will add significantly to the bill of materials compared to the traditional resistor solution presented in FIG. 1.

It is, inter alia, an object of the invention to provide an improved power converter. To this end, the invention provides a power converter as defined in claim 1. Advantageous embodiments are defined in the dependent claims.

These and other aspects of the invention will be apparent from and elucidated with reference to the embodiments described hereinafter.

Figure 1:
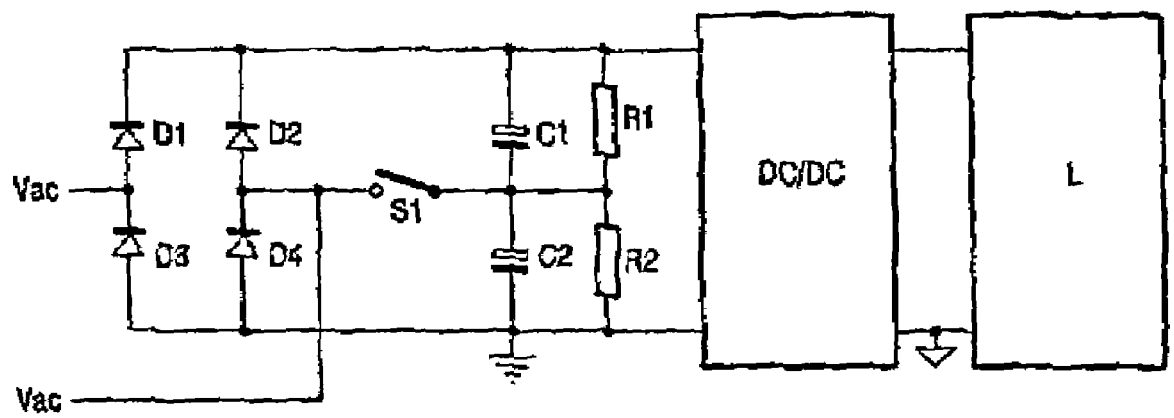
FIGS. 1-2 show prior art power supply circuits.
Figure 2:
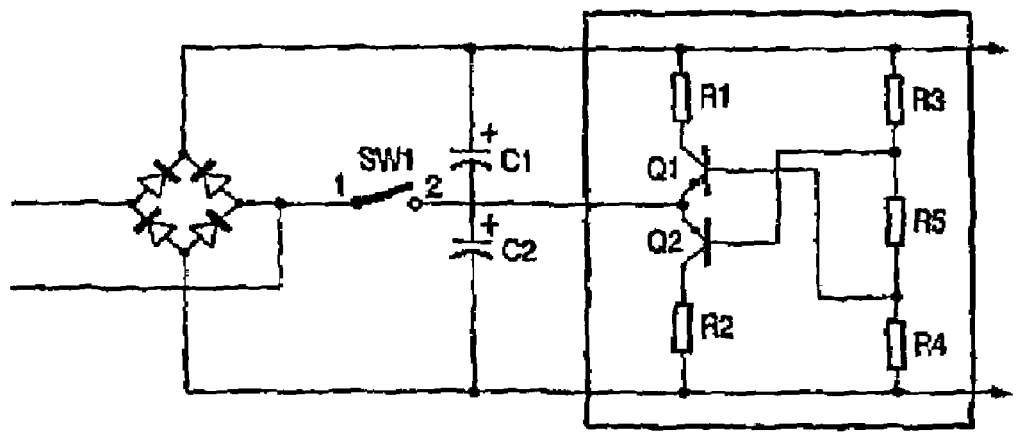
Figure 3:
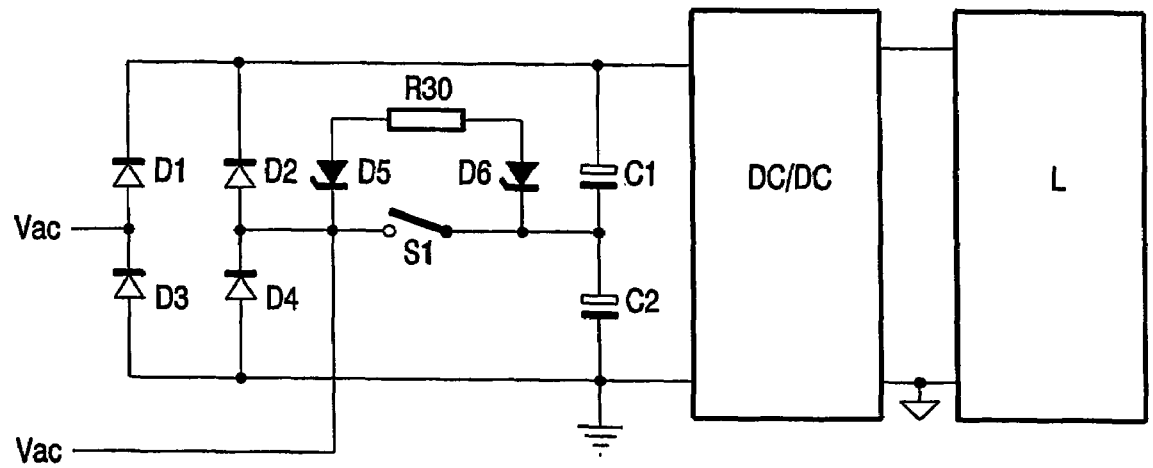
FIGS. 3-8 shows embodiments of a power supply circuit in accordance with the present invention.

Using the implementation of FIG. 3, in case of an overvoltage condition, zener diodes D5 and D6 protect the capacitors C1 and C2 by creating a parallel path for the leakage current. An advantage is that D5 and D6 are only conducting at the moment an overvoltage condition occurs (depending on the dimensioning of course), reducing the dissipation level to an absolute minimum since no resistors are involved. Also, the system costs of this embodiment are clearly lower than in the prior art of FIG. 2. The optional resistor R30 in the parallel path serves to limit the current though the zener diodes D5, D6. In an alternative to the embodiment shown in FIG. 3, the zener diodes may be connected each in the opposite direction with the arrows pointing towards each other.

Figure 4:
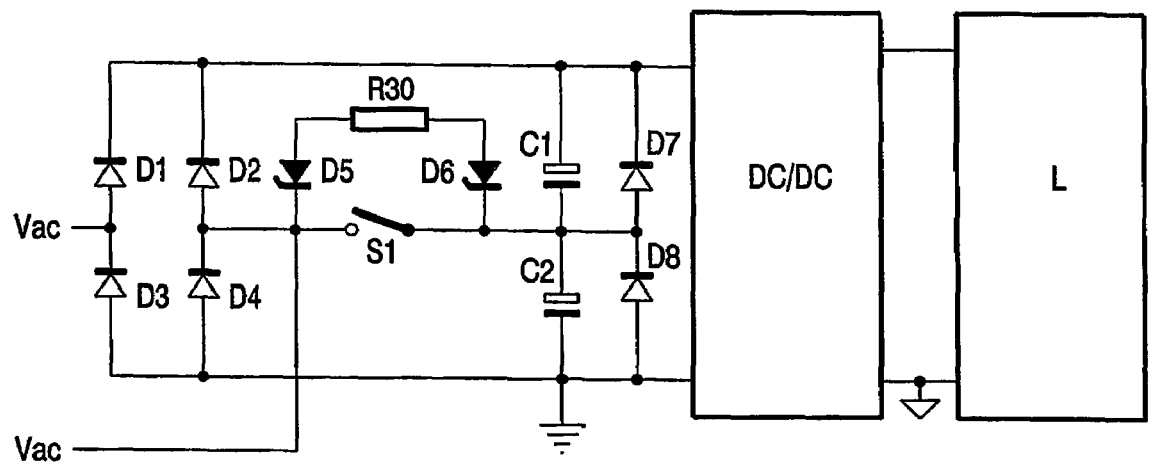

In case C1 and C2 do not have the same value (e.g. not the same production batch) or the leakage currents are far from equal, the implementation of FIG. 4 can be used. In FIG. 4, diodes D7 and D8 are connected in parallel to the capacitors C1 and C2. The diodes D7 and D8 are connected such that normally no current flows through these diodes.

Figure 5:
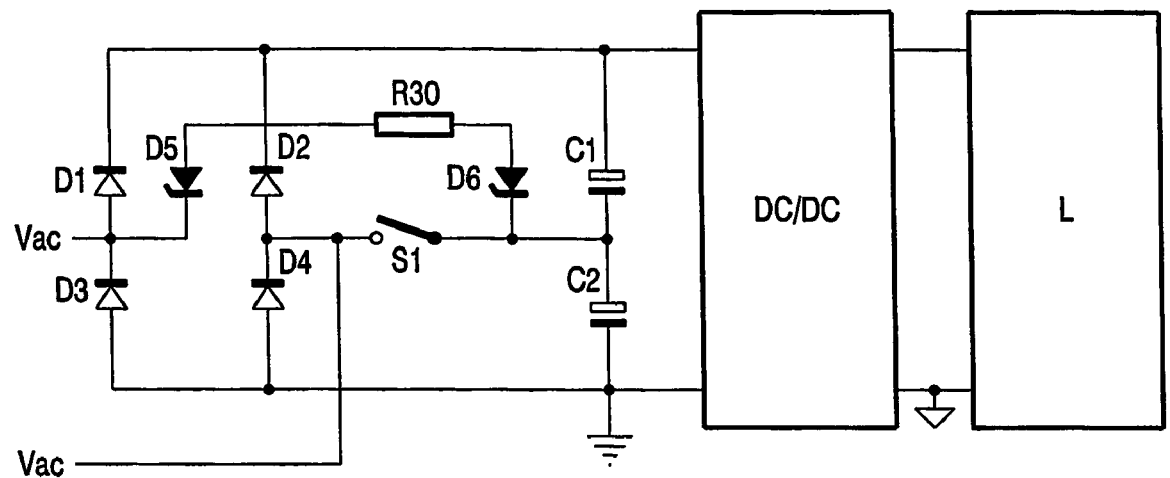

The embodiment of FIG. 5 provides the same function, although the overvoltage protection circuit is no longer short-circuited by the switch S1 if that switch is closed if an input AC voltage of about 110 V is applied, so that in this respect the embodiment of FIG. 5 is less favorable.

Figure 6:
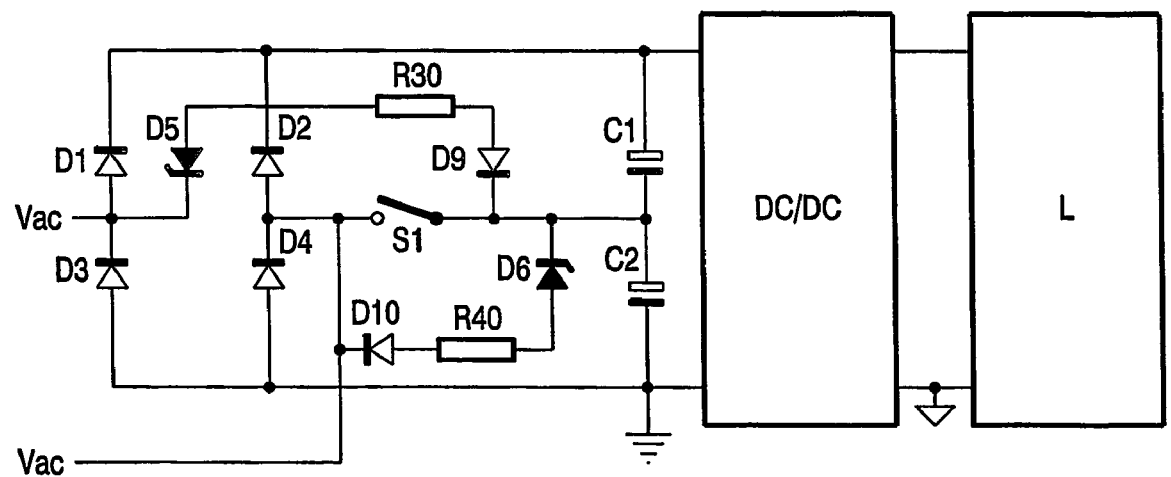

FIG. 6 shows a fully symmetrical alternative in which the overvoltage protection circuit comprises two branches, between a midpoint of the two capacitors and mutually different inputs of the rectifier circuit, each branch comprising a zener diode D5, D6, a resistor R30, R40, and a diode D9, D10. In this embodiment both capacitors C1, C2 are clamped simultaneously.

Figure 7:
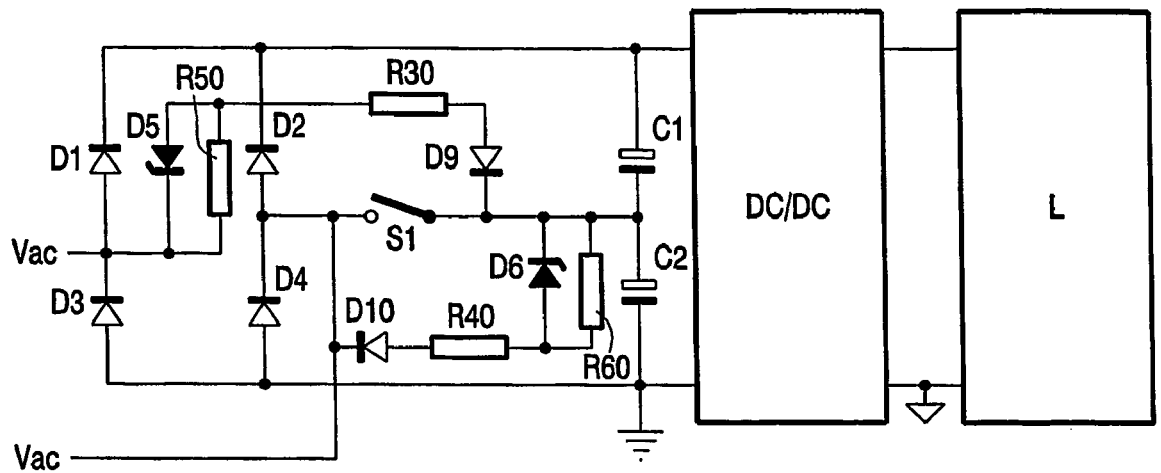
Figure 8:
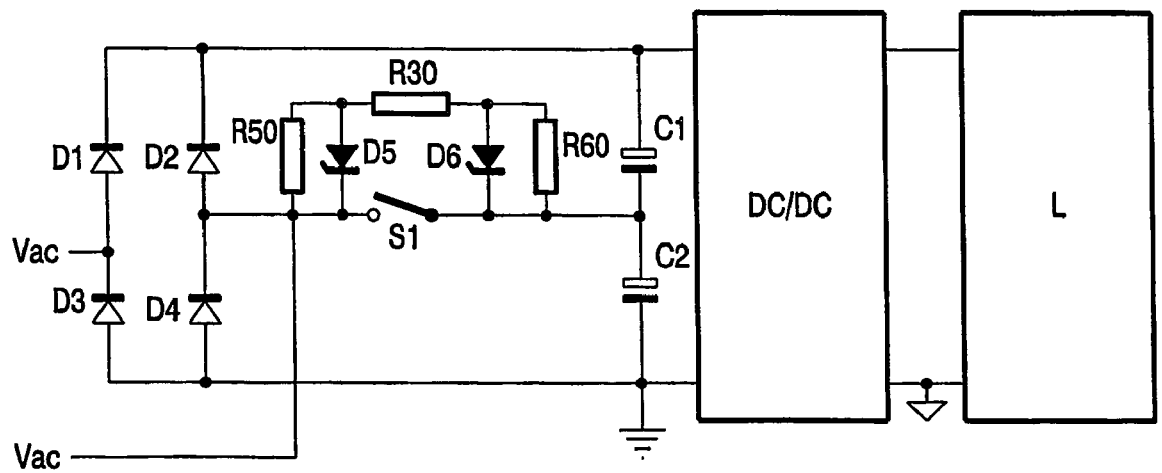

As shown in FIGS. 7 and 8, resistors R50 and R60 may be connected in parallel to the zener diodes D5 and D6, respectively. This results in the advantage that the voltage at the midpoint between the capacitors C1, C2 is balanced at half the DC output voltage.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. A power converter comprising: a rectifier arrangement having inputs coupled to AC power supply terminals; a pair of series-connected capacitors coupled across output terminals of the rectifier arrangement; a switch coupled between one of said AC power supply terminals and a midpoint of the pair of series-connected capacitors, the switch being open if a first AC voltage is applied to the AC power terminals, and the switch being closed if a second AC voltage is applied to the AC power terminals, the first AC voltage exceeding the second AC voltage; and an overvoltage protection circuit coupled between at least one of the inputs of the rectifier arrangement and the midpoint of the pair of series-connected capacitors, the overvoltage protection circuit comprising a series connection of zener diodes having opposite conductivity directions.

2. A power converter as claimed in claim 1, the overvoltage protection circuit further comprising a resistor in series with the zener diodes.

3. A power converter as claimed in claim 1, further comprising diodes each connected parallel to a corresponding one of the capacitors.

4. A power converter as claimed in claim 1, the overvoltage protection circuit comprising resistors connected in parallel to the zener diodes.

5. A power converter as claimed in claim 1, the overvoltage protection circuit being coupled across the switch.

6. A power converter comprising: a rectifier arrangement having inputs coupled to AC power supply terminal; a pair of series-connected capacitors coupled across output terminals of the rectifier arrangement; a switch coupled between one of said AC power supply terminals and a midpoint of the pair of series-connected capacitors, the switch being open if a first AC voltage is applied to the AC power terminals, and the switch being closed if a second AC voltage is applied to the AC power terminals the first AC voltage exceeding the second AC voltage; and an overvoltage protection circuit coupled between at least one of the inputs of the rectifier arrangement and the midpoint of the pair of series-connected capacitors, the overvoltage protection circuit comprising a first branch between the midpoint and a first one of the rectifier arrangement inputs, and a second branch between the midpoint and a second one of the rectifier arrangement inputs.

7. A power converter as claimed in claim 6, each branch comprising a series connection of a diode and a zener diode having opposite conductivity directions.

8. A power converter as claimed in claim 7, the overvoltage protection circuit comprising resistors connected in parallel to the zener diodes.

\* \* \* \* \*